April 22, 1930.  R. B. COFFMAN  1,755,574
HOISTING DEVICE
Filed May 31, 1929

Inventor,
Robert B. Coffman,
By Sterling P. Buck,
Attorney.

Patented Apr. 22, 1930

1,755,574

UNITED STATES PATENT OFFICE

ROBERT B. COFFMAN, OF NEW ALEXANDRIA, PENNSYLVANIA

HOISTING DEVICE

Application filed May 31, 1929. Serial No. 367,469.

This invention relates to hoisting devices, and especially to a hoisting attachment for tractors.

One object of this invention is to provide a comparatively simple and very effective unitary hoisting device which can be quickly and easily attached to a tractor in such relation that it can be conveniently and easily operated by a driver on the driver's seat of the tractor, and which is effective for raising a scoop or other object at the rear part of the tractor.

Another object is to provide a device of this character which effectively holds the scoop or other raised body in any one of an infinite number of elevations without manual aid in holding the same.

Another object is to provide a device of this character which is attachable to the tractor by means of essential parts of the tractor, and without interfering with the operation or effectiveness of the tractor.

Other objects and important features are pointed out or implied in the following details of description, in connection with the accompanying drawings in which.

Figure 1:
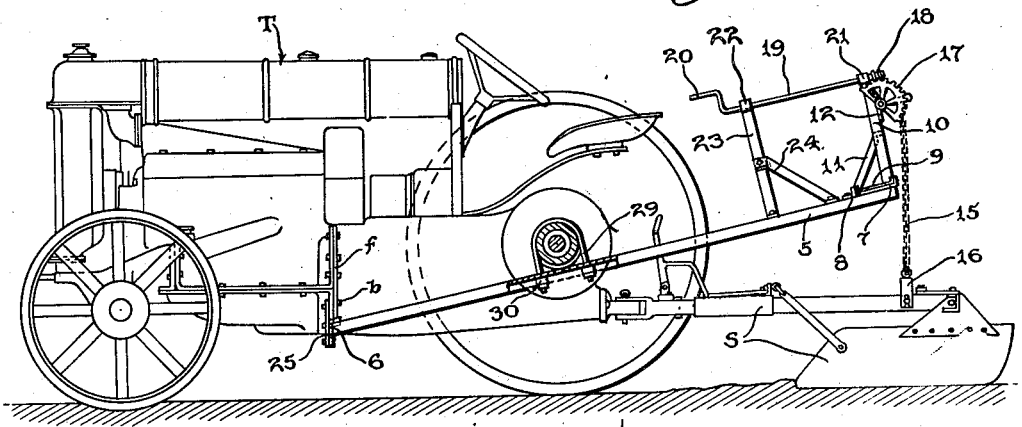
Figure 1 is a view partly in elevation and partly in longitudinal vertical section, of a Fordson tractor having a scoop attached to its hitching lug, and having my improved hoisting device attached to the tractor and to the scoop.

Referring to these drawings in detail, in which similar reference character correspond to similar parts in the several views, and in which the tractor is shown somewhat conventionally, but of the general type of a Fordson tractor, and is generally indicated at T; and in which the scoop is generally indicated at S, and is the subject matter of another patent application; the invention will now be described in detail as follows:—

Figure 2:
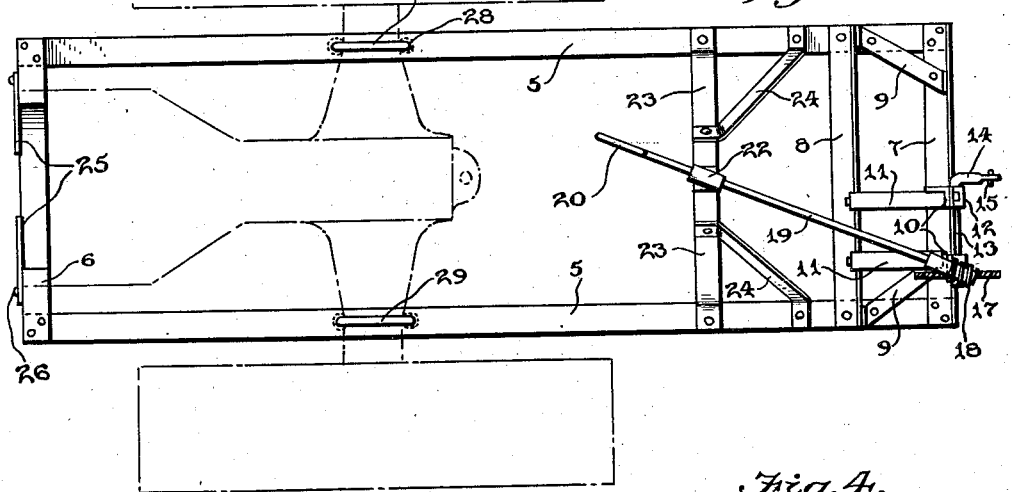
Fig. 2 is a plan view of my improved hoisting device or scoop lifter, and a part of the tractor, the latter being shown in broken lines, and serving to show the attaching relation of the hoisting device to the tractor.
Figure 3:
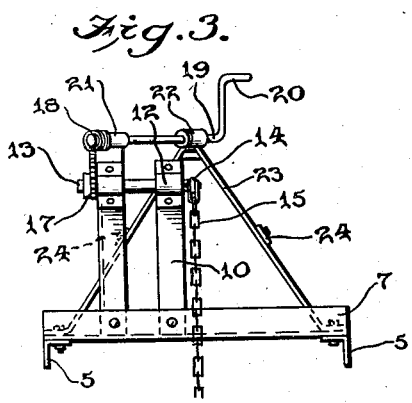
Fig. 3 is a rear end view of the hoisting device detached from the tractor.
Figure 4:
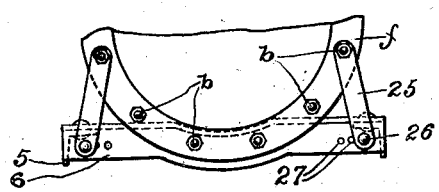
Fig. 4 is a view of the front end or cross bar attached to the middle part of the tractor body by means of two of the series of bolts which hold the front and rear sections of the tractor body in united relation.

A rectangular frame, preferably of structural angle beams, is completely shown in Fig. 2, and includes two relatively long parallel angle beams 5 which may be either L-shaped, as shown, or of any other appropriate cross sectional shape. Two relatively short cross beams 6 and 7 are united with the front and rear ends, respectively, of the beams 5. An intermediate cross beam 8 is spaced a slight distance in front of the rear beam 7, and brace bars 9 are united with the rear beam 7 and extend angularly therefrom to the respective beams 5, at points between the beams 7 and 8, and are secured by rivets, bolts or other appropriate means.

Uprights or standards 10 are secured to the beam 7, and braces 11 extend downward and forward from the standards 10 to the beams 5, and are secured by appropriate means. Bearings 12 are secured on the uprights 10, and a rock-shaft or lever 13 is journalled in these bearings. To an arm 14 of this rock shaft, a chain 15 depends and terminates in a clevis 16 for attachment to any object to be lifted by the hoisting device. In Fig. 1, the clevis 16 is shown attached to the draw-beam of the scoop S. On the rock-shaft 13, a worm segment 17 is secured, and meshes with a worm 18 on a handle-shaft 19 which has a crank-handle 20 on its front end. The rear end of the handle-shaft is journalled in a bearing 21 on the leftward standard 10. The rightward standard 10 is adjacent to, but slightly leftward of the median plane of the frame. Within such median plane, the lifting arm 14 is disposed, and also a bearing 22, this bearing being secured on and supported by two uprights or inwardly inclined beams or beam-sections 23 which form an apex under the bearing 22 and are braced by two beams or brace members 24. While these drawings indicate that the frame members and uprights are secured by rivets or bolts, they may be secured by electric welding or other appropriate means.

The front beam 6 is preferably depressed at its middle part, to receive the under side of the tractor body at the flanges *f* of the front and rear sections of the tractor. As is well known, these flanges are curved, and are apertured to receive securing bolts *b*. Two of these bolts *b*, extend through the upper apertured ends of securing links 25 which have their lower ends secured to the beam 6. The links 25 are preferably pivotally secured, as indicated at 26, and the pivots are preferably removable bolts, which may be interchanged from the position shown, into engagement with any one of the number of bolt-holes 27 in the front beam 6, for adjustment, according to the different forms of tractors to which the device is attachable. Two of the bolts *b* extend thru bolt-holes near the middle of the beam 6, and combine with the links 25 to very securely hold the front end of the frame in position.

About midway between the front end beam 6 and the uprights 23, the beams 5 are apertured at 28 to receive U-bolts or screw-threaded yokes 29 having nuts 30 on their screw-threaded ends. These U-bolts 29 straddle the respective ends of the gear-casing of the tractor T, and the nuts, when tightened against the lower surfaces of the L-beams 5, serve to firmly unite the beams 5 with the gear casing, while the front end of the frame is united with the flanges *f* by means of the links 25, as previously explained.

From the foregoing description and explanation, in connection with the drawings, it will be seen that when it is desired to raise the scoop or other object which is fastened to the chain 15, it is only necessary for the driver (on the seat of the tractor) to extend his right arm slightly rearward, grasp the crank-handle 20, and turn it in the proper direction, and the crank-handle will cooperate with the shaft 19, worm 18, segment 17 and chain 15, for easily raising the object attached to the chain. When it is raised, and when the hand is released from the crank-handle 20, it will remain raised, because of the intermeshing relation of the worm with the worm wheel or worm segment. When it is desired to lower the scoop or other object attached to the chain 15, the handle crank 20 is turned in the opposite direction from that required to raise the object. If the bearings of the rock shaft 13 and of the shaft 19, and the teeth of the gear members 17 and 18 are kept properly lubricated, the operation of the device is quick and very easy.

Although I have described this embodiment of my invention very specifically, it is not my intention to limit my patent protection to these exact details of construction and arrangement, for the invention is susceptible of changes within the scope of the inventive ideas as implied and claimed.

What I claim as my invention is:

1. In a hoisting device designed for attachment to a tractor which includes a gear-casing; a frame which comprises side-beams, a rear end-beam united with the rear ends of the side-beams, two standards united with the rear end-beams and extending upward therefrom, and two bearings on said standards; in combination with a rock-shaft in said bearings and including an arm, means on said arm for connecting it to a load to be lifted, a worm-gear member on said rock-shaft, a worm meshing with said worm-gear member and cooperative therewith to turn said rock-shaft in opposite directions, a handle-shaft connected to said worm and extending forward and being operable to rotate said worm, yokes to extend over the respective ends of the gear-case of the tractor and provided with means to secure them to said side bars, and means at the front end of the side bars to engage with the intermediate part of the tractor and cooperate with said yokes for holding the side bars in a rearwardly and upwardly inclined position.

2. In a hoisting device designed for attachment to a tractor which includes a gear-casing; a frame which comprises side beams, a front end beam united with the front ends of the side beams, uprights on said side beams, a bearing on said uprights, a second bearing, a pair of horizontally alined bearings, and means on said rear end-beam to support said second bearing and pair of alined bearings; in combination with a rock-shaft having an arm and being journalled in said horizontally alined bearings, means on said arm to connect it to a load to be lifted, a worm-gear member united with said rock-shaft, a worm meshing with said worm-gear member, a handle-shaft journalled in the first said and second said bearings, means to secure the intermediate parts of said side bars to said gear-casing, and means on the front ends of said side bars to hold them in substantially fixed relation to the tractor.

3. In a hoisting device designed for attachment to a tractor which includes a gear-casing having tubular ends; a frame which comprises side beams, a front end beam united with the front ends of the side beams, a rear end-beam united with the rear ends of the side beams, uprights on the side beams at points between the middle and the rear ends thereof, a bearing on said uprights, a second bearing, two horizontally alined bearings, and means on said rear end-beam to support said second bearing and horizontally alined bearings, said side beams having openings at points between said uprights and said front end-beam; in combination with yokes to extend over the said tubular ends of the tractor's gear-casing and through said openings and provided with means to secure them in the openings while the said front end-beams extend under the body of the tractor, a rock-shaft journalled in said alined bearings and having an arm provided with means for attaching it to a load to be lifted, a worm-member united with said rock-shaft, and a handle-shaft journalled in the first said and second said bearings and operatively connected to said worm.

4. In a hoisting device designed for attachment to a tractor which includes a gear-casing having tubular ends, and joining screws at its middle part; a rectangular frame comprising side beams, a front end-beam having its ends united with the front ends of said side beams, a rear end-beam having its ends united with the rear ends of the side beams, uprights on the side beams at points between the middle and the rear ends of the latter, and a bearing on said uprights; in combination with yokes to straddle said tubular ends of the gear-casing and provided with means to secure them to the side beams and hold the latter up against the under side of said tubular ends, the front end-beam being provided with means to receive at least one of the said joining screws for holding the front end of the frame in a definite relation to said tractor, a gearing mechanism provided with means attachable to a load to be lifted, means on said rear end-beam to support said gearing mechanism, and manually operable means journalled in said bearing and operatively connected to said gearing-mechanism for operating the latter.

5. In a hoisting device, a frame including side beams having their middle parts and front ends provided with means to attach them to a tractor in such relation that their rear ends extend rearwardly from the tractor, a rear end-beam having its ends united with the rear ends of said side beams, a standard on said rear end-beam at a point between the middle and an end of the latter, and a horizontal bearing on said standard; in combination with a rock-shaft journalled in said bearing and having an arm extending rearward from a point over the middle part of said end beam, means on said arm for connecting it to a load to be lifted, an upright supported by at least one of said side beams at a point between its middle part and said standard, a bearing on said upright, a manually rotatable member journalled in said bearing, and means operatively connecting said manually rotatable member to said rock-shaft for combining therewith to raise and lower said arm.

6. In a hoisting device, a frame including side beams having their front and middle parts provided with means to attach them to a tractor in such position that the rear ends extend rearward from the tractor, a rear end-beam having its ends united with the rear ends of the side beams, an upright on the part that extends rearward from the tractor but at a distance from said rear end-beam, a bearing on said upright, a second bearing, and means on said rear end beam to support said second bearing; in combination with a lifting member mounted for rotary movement in said second bearing, means secured to said lifting member and connectable to a load for lifting the latter, and a manually operable member journalled in the first said bearing and operatively connected to said lifting member for effecting rotary movements thereof.

7. In a hoisting device, a frame including side beams having their front ends provided with means to connect them and to extend under the body of a tractor, their middle parts being provided with means to extend over the tractor's gear-casing and hold the frame in such relation that its rear end extends upward and rearward from the rear end of the tractor, a rear end-beam having its ends united with the rear ends of said side beams, an upright supported by at least one of said side beams and having a bearing thereon, a second bearing, and means on said rear end-beam for supporting the said second bearing; in combination with a lifting member journalled in said second bearing, means depending from said lifting member for connecting it with a load to be lifted, a manually operable member journalled in the first said bearing, and means operatively connecting said manually operable member to said lifting member for effecting rotary movements of the latter.

In testimony whereof I affix my signature.

ROBERT B. COFFMAN.